United States Patent [19]

Lindsey

[11] Patent Number: 4,667,840

[45] Date of Patent: May 26, 1987

[54] FIRE-RESISTANT ELECTRICAL JUNCTION BOXES AND METHOD OF MANUFACTURE

[76] Inventor: Travis C. Lindsey, 7177 Enterprise Dr., Las Vegas, Nev. 89117

[21] Appl. No.: 914,941

[22] Filed: Oct. 3, 1986

Related U.S. Application Data

[63] Continuation-in-part of Ser. No. 672,086, Nov. 16, 1984, Pat. No. 4,616,104.

[51] Int. Cl.⁴ .............................................. H02G 3/08
[52] U.S. Cl. ..................... 220/3.2; 220/3.3; 174/48
[58] Field of Search ............... 220/3.2, 3.3, 3.9, 3.94, 220/469; 174/48, 50, 53

[56] References Cited

U.S. PATENT DOCUMENTS

| | | | |
|---|---|---|---|
| 2,297,862 | 10/1942 | Bachmann | 220/3.94 X |
| 2,445,244 | 7/1948 | Seaver | 174/48 X |
| 3,620,404 | 11/1971 | Grasso | 174/48 |
| 4,134,636 | 1/1979 | Kleinatland et al. | 220/3.9 X |
| 4,408,695 | 10/1983 | Balkwill et al. | 220/3.3 |
| 4,580,689 | 4/1986 | Slater | 220/3.2 |
| 4,616,104 | 10/1986 | Lindsey | 174/48 |

*Primary Examiner*—Steven M. Pollard
*Attorney, Agent, or Firm*—Edward J. Quirk

[57] ABSTRACT

An electrical junction box has an interior electrical component container having a forward opening, and a second rearwardly opening container portion which opens rearwardly and is filled with insulating material. The housing is a one-piece unit preferably molded from fire-resistant fiberglass. The junction box is manufactured by molding a one-piece fiberglass housing, filling the rearwardly opening chamber with a fluid insulating material such as calcinated gypsum, allowing the insulating material to harden, and drilling a hole from the exterior of the unit into the interior chamber to permit wiring or conduits to extend to the box.

9 Claims, 4 Drawing Figures

FIRE-RESISTANT ELECTRICAL JUNCTION BOXES AND METHOD OF MANUFACTURE

This application is a continuation-in-part of application Ser. No. 672,086, filed Nov. 16, 1984, now U.S. Pat. No. 4,616,104, issued Oct. 7, 1986.

BACKGROUND OF THE INVENTION

This invention relates to electrical boxes, such as outlet or junction boxes, which are used in commercial or residential buildings. More particularly, the invention relates to electrical boxes having a molded noncombustible exterior which precludes the passage of fire and minimizes sound transmission.

The risk of the passage of fire through a wall from one interior space of a building to another through electrical junction boxes is not readily apparent to a layman but is well known to those in the business of fire safety. In many cases, a firefighter's ability to extinguish a fire with minimal damage may depend upon the ability to contain the fire within a relatively small space. While walls may be made of fire-resistant material, a rampaging fire may escape through holes in the ceiling or walls frequently used to house electrical boxes. Once the fire penetrates the walls, it may travel rapidly through spaces between the walls into attic or crawl space areas, spreading rapidly. Accordingly, the ability to confine a fire to a single room may depend upon the ability to preclude its travel through electrical fixtures.

Unfortunately, the ability to impede travel of a fire through electrical boxes is often elusive. For example, in the installation of electrical boxes in walls and ceilings, the proper frontal alignment of the face plate of the box is difficult since deformities (knots, splits, checks, or holes) may exist in the framing members to which the box is attached. To compensate for these deformities, it is common to tilt the box at an angle in the wall, resulting in an improper seal around the opening of the box. In addition, the attachment of the box to the wall is frequently not secure. Thus, in the process of fighting the fire, the impact of a water stream from a hose on the electrical box may deform the box, allowing the fire to proceed through the wall.

Another installation problem relates to the use of veneer on walls or floors with various types of tile, brick, paneling, or similar materials. Where these veneers are of uneven thickness, deformities exist around the opening of the outlet which leave cracks and frequently cause warpage of the outlet coverage even causing breakage of these covers. In addition, it is frequently necessary to position the electrical outlet in the wall taking into account the thickness of the wall treatment that will ultimately be mounted on the wall. If the box is mispositioned in the wall such that the face of the box protrudes through the surface of the wall sheathing, either the sheathing may have to be removed and the box repositioned, or a metal spacer may be placed around the wall opening in order to extend the wall surface to the proper installation depth to permit the electrical box cover to compress snugly against the wall face. Boxes installed in this manner may be easily dislodged or broken in the event of a blow or impact on the face of the box.

Another typical danger is caused by the over-tightening of mounting screws for ceiling-mounted lamps, causing the electrical box in the ceiling to become tilted. This may cause weakening of the mounting bracket, or even extraction of the nails holding the box to the framing members, destroying any caulking used to seal the box and attenuate sound.

In addition to fire resistance in apartment, hotel, condominium, and similar buildings, it is desirable to provide as much sound resistance as possible between the various dwelling units to protect the privacy of its occupants. Regardless of thickness of wallboard or quantity of insulation between the walls, sound will travel through the openings made in walls for electrical outlet boxes, particularly through small cracks or holes in the conventional electrical boxes that are used in the construction of these facilities.

The present invention provides an electrical box formed from a one-piece molded housing having an interior electrical component housing chamber and an exterior chamber formed by an exterior housing around the electrical box that is filled with a fire-resistant or refractory material. The entire unit is factory produced and presealed, with no cracks or holes existing in the unit. After fabrication of the unit, a transverse bore is drilled from top to bottom through the entire unit, enabling passage of electrical conduits into and out from the box. The box is mounted to the wall with a conventional mounting bracket. The electrical boxes of the invention render the passage of a fire through the box into an adjacent room virtually impossible.

Various methods have been tried in the past for increasing the fire resistivity of electrical junction boxes. For example, in Moll, U.S. Pat. No. 3,720,783, a cover member is provided for a junction box which forms a tubular collar which can be broken away along a series of lines of weakness in order to conform the front of the junction box with the wall surface. This collar is simply attached mechanically to the front of the electrical box. A similar collar attachment is shown in Hitchcock, U.S. Pat. No. 4,087,624, where a collar of adjustable size is attached to the junction box. In addition, it is known to insulate the interior of various housings with a fire-resistant coating, such as asbestos, as is shown in Cole, U.S. Pat. No. 3,646,244, Palmer, U.S. Pat. No. 4,307,813, and Hune, U.S. Pat. No. 4,413,683. Eternit, German No. 28 06 374, shows an exterior collar around a conventional socket outlet filled with intumescent material which foams when the socket degrades to fill the hole remaining in the wall.

Accordingly, it is an object of the present invention to provide a factory-manufactured electrical box having an integrally molded fire-resistant sheathing. It is yet another object of the invention to provide an electrical box housing having a one-piece molded exterior and interior portions which form a chamber into which liquid insulating material may be cast and hardened. It is yet a further object of the invention to provide an electrical box which minimizes the potential for transport of fire and sound through the box or the opening in the wall cut for the box. These and other objects of the invention will be obvious from the following description of a preferred embodiment thereof.

BRIEF SUMMARY OF THE INVENTION

An electrical junction box is a one-piece molded unit having an interior electrical box portion formed from side and rear walls and having a forward opening, and a housing portion having a front wall extending outwardly from the electrical box side walls around its entire periphery, and having housing side walls extending rearwardly from the front wall past the bottom of the electrical box. The side walls of the housing are spaced from and parallel to the side walls of the electrical box portion. The exterior walls of the electrical box and the interior walls of the housing form a rearwardly opening chamber which substantially surrounds the electrical box and into which may be poured a fire-resistant insulating material, such as plaster of paris or dense polyurethane foam, thus insulating substantially the entire electrical box. The junction box is formed by fabricating the molded housing, pouring the fire-resistant material in the rear chamber of the junction box, and allowing the material to harden or set-up. A bore is drilled through at least one side wall of the box to enable electrical conduit to be fed into the box.

BRIEF DESCRIPTION OF THE DRAWINGS

The invention is best understood with reference to the drawings, in which.

DETAILED DESCRIPTION OF A PREFERRED EMBODIMENT

Figure 1:
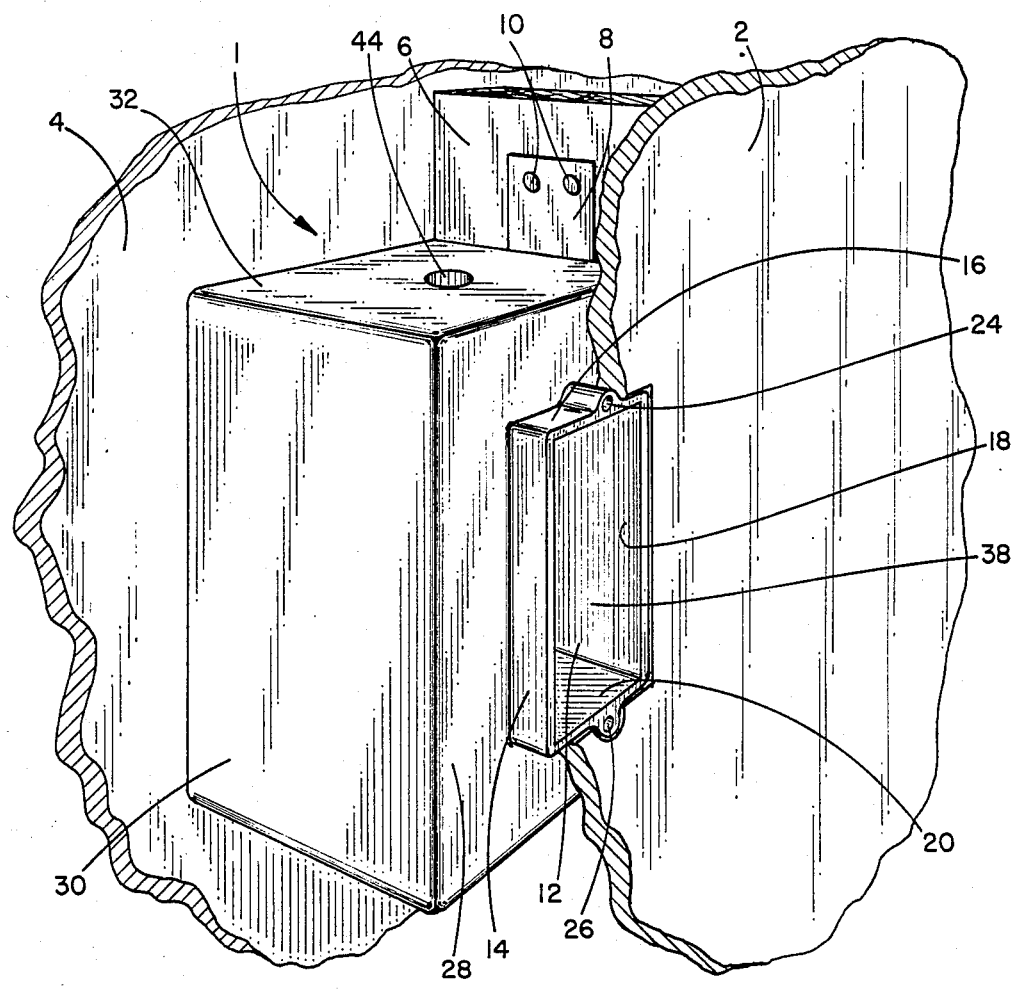
FIG. 1 is a perspective view of an electrical junction box of the invention mounted in a wall, with the front and rear drywall partially cut away.

Electrical junction box 1 is mounted between front and rear drywall sheets 2 and 4 on a conventional 2" by 4" stud by means of mounting bracket 8. The mounting bracket is a conventional bracket which is welded or glued to the side of the junction box and is attached to the stud by means of nails 10, as shown in FIG. 1.

The junction box 1 consists generally of an interior electrical box portion 12 and an exterior housing portion which encases the insulative material around the electrical box. The electrical box portion and the housing portion each comprise portions of a single molded junction box member. Electrical box portion 12 consists of a box-like member formed from side walls 14, 16, 18, and 20, and rear wall 22 (see FIG. 2). The box has a generally rectangular cross sectional shape, consistent with existing commercial electrical boxes. A pair of lugs 24 and 26 having longitudinal bores therein are molded at the top and bottom central portions of walls 16 and 20, respectively, and receive mounting screws for a face plate or electrical device. In this manner, the box is similar to existing junction boxes.

Figure 2:
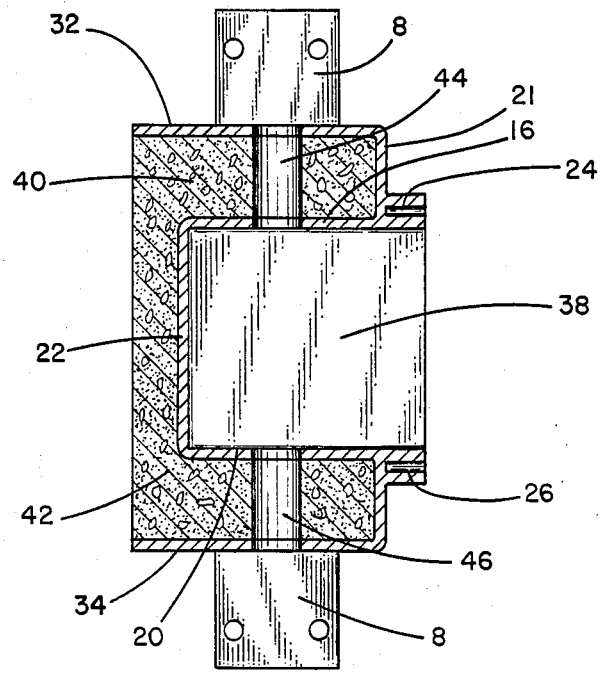
FIG. 2 is a side section view of the junction box.
Figure 3:
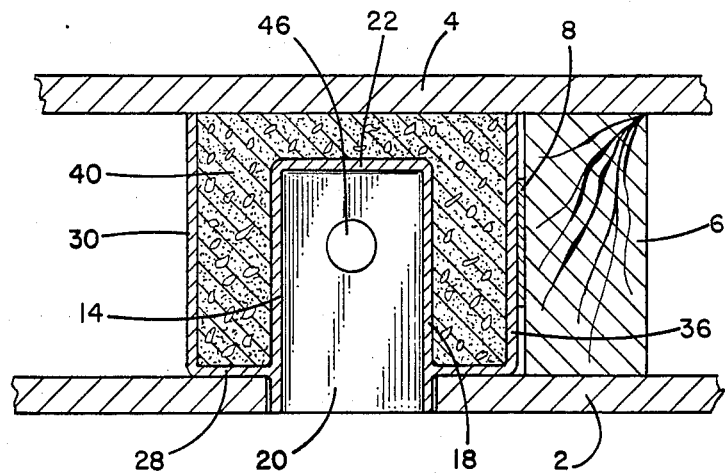
FIG. 3 is a top section view of the junction box mounted in a wall.

The housing portion of the junction box is formed by a front wall 28, and side walls 30, 32, 34, and 36 (see FIGS. 2 and 3). The front wall extends outwardly and perpendicularly from the side walls of the electrical box portion around its entire periphery. The housing side walls extend rearwardly perpendicularly from the front wall to form a second box-like member having a rearward opening. As shown in FIGS. 2 and 3, a rearwardly opening chamber 40 is formed in the unit by the exterior surfaces of the side walls 14, 16, 18, and 20 of the electrical box portion, and the interior surfaces of the front wall 28, and the side walls 30, 32, 34, and 36 of the housing portion. The side walls of the housing portion extend rearwardly beyond the bottom wall of the electrical box portion by at least ½" and preferably at least ¾". Accordingly, the junction box has a forwardly opening chamber 38 for receiving electrical components, and a rearwardly opening chamber 40 for containing insulative material.

The front wall intersects the side walls of the electrical box portion unit at a distance of from about 3/16"-¾" rearwardly of the front edge of the electrical box side walls. Accordingly, the box appears to have a collar portion which extends forwardly from the front wall of the housing by about 3/16"-¾". The collar portion is adapted to extend through the drywall as shown in FIGS. 1 and 3, thereby minimizing the ability of fire or sound to escape around the opening of the box through the wall formed by the stud and drywall.

The entire rear chamber 40 is filled with fire-resistant material 42, which may be calcinated gypsum, mica, silica, fiberglass, perlite, Vermiculite, RTV foam, high alumina cement, fireproof polyurethane foam, or other insulating material. While the material may be a solid prior to inserting into the chamber, it is strongly preferred to have a liquid or foam material which can be inserted into the chamber and thereby conformed to the chamber walls without leaving void spaces. Refractory materials are preferred. A typical example of a preferred composition is 15-25% masonry cement, 15-25% plaster, 15-25% perlite (all by weight), with the balance being water. Typically, the insulating material has a compressive strength of 300-1,000 psi, a density of 30-140 lbs/cu.ft., and a thermal conductivity of about 2-5 BTU/in. at 150° C.

A typical junction box according to the invention has a height of about 5½", a width of 4¼", and a depth from the front of the front wall to the back of the unit of 3⅜". The collar portion extends about ½"-5/8" in front of the front wall. The interior dimensions of the electrical box are approximately 2 15/16" by 1 15/16". If desired a box may be fabricated with multiple openings, with the entire unit being concomitantly larger.

The entire unit is molded in one piece from a fire-resistant moldable material, which may be a fire-resistant plastic but is preferably fiberglass. A fiberglass resin mix using very short glass fibers of the same diameter commonly used in the housing industry for thermal insulation is used. A specific example of a suitable material is Allied No. FRP12022 fiberglass reinforced unsaturated polyester resin (bulk molding compound) with fire retardant clay material and short glass fibers is acceptable and has been approved by Underwriter's Laboratories. The molding technique is conventional. The housing walls are approximately ⅛" thick, except for the collar portion which is about 3/16" thick. The collar portion can be machined with a power tool to conform to the wall surface in which it is mounted, as described in my previous U.S. Pat. No. 4,616,104, issued Oct. 7, 1986. As fabricated, the unit has a first forwardly opening interior container portion, and second rearwardly opening container portion formed by walls extending outwardly and rearwardly from the walls of the first container portion, such that the second walls substantially surround the walls of the first container. The term "substantially surround" here means that the walls are surrounded completely except for the collar portion of the first container which extends outwardly from the forward portion of the unit.

The junction box of the invention is easily manufactured in mass quantity by molding the exterior unit, pouring a liquid or foam insulating material into the rear chamber, and allowing the insulating material to harden. After the material is hard, a bore is drilled through the entire container from top to bottom as best seen in FIG. 2. The drill bit passes downwardly through the center portion of top wall 32, forming a first bore 44 at the top portion of the unit and a second bore 46 at the bottom portion of the unit. These bores are used for access of electrical wiring or other components to the interior chamber 38 of the electrical box portion of the unit. If desired, only a single bore may be drilled into the unit if all of the electrical components can pass in and out of the same bore. When the boxes are installed in the field, plugs of intumescent material may be placed by the installer around the electrical conduit entering and leaving the junction box; therefore, in the event of a fire, the fire will not be able to travel into the electrical box and through the bore into the wall. If desired, metal pipe or other conduit can be attached directly to the electrical box by means of conventional pipe fittings as shown in my U.S. Pat. No. 4,616,104.

Figure 4:
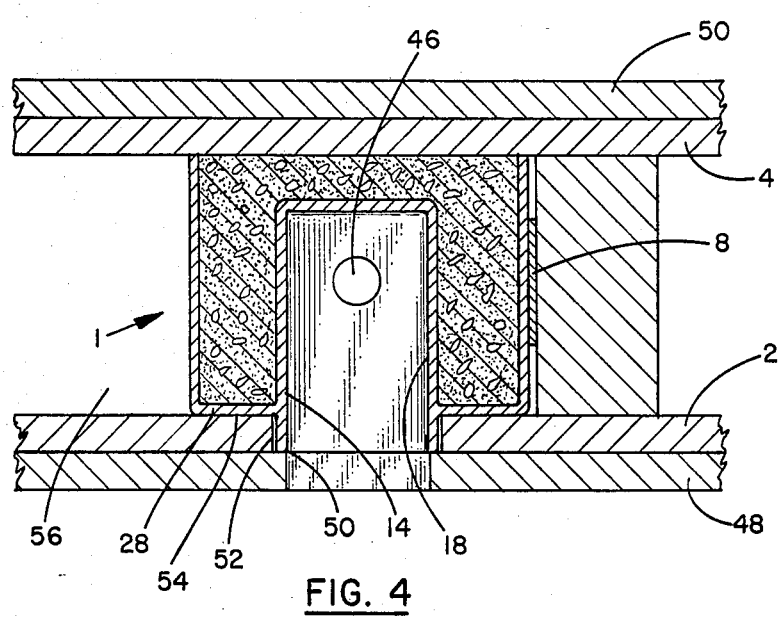
FIG. 4 is a top section view of the junction box mounted in a fire wall having double drywall thickness.

FIG. 4 shows an embodiment where the junction box of the invention is mounted in a fire wall. The fire wall is fabricated from opposing double layers of drywall; the front layer is drywall sheet 48 which is mounted in front of drywall sheet 2, and rear drywall sheet 4 is backed by sheet 50. Double drywall layers are commonly required by governmental codes for fire walls. According to the invention, the front drywall layer is cut with an aperture having a width corresponding to the inside dimensions of the side walls of the electrical box portion of the junction box. Accordingly, in combination with the box of the invention, it is very difficult for fire or sound to penetrate the opening caused by the junction box. The reason for the fire and sound resistant nature of this design is the tortuous path created by the mounting of the box in the wall for fire or sound to penetrate the wall. As is apparent from the drawing, sound or fire entering the junction box must pass through a small crevice 50 between the front of the box and the front layer of drywall, then turn 90° into a small crevice 54 between the rear layer of drywall and the outside wall of the electrical box, turn again 90° and pass between the front wall of the housing and the rear surface of the second drywall layer, and then pass again at right angles into the space 56 between the two fire walls. It is well understood that creation of a tortuous path for fire and sound increases the probability that it will not traverse the path. The bore 46 is of course sealed either by intumescent material or by a metal pipe.

Within the scope of the invention, a number of modifications and variations may be made which would be clear to persons skilled in the art. These modifications and variations are within the contemplation of the invention. Accordingly, the invention should not be considered limited by the specific embodiment disclosed herein, but rather should be defined only by the following claims.

I claim:

1. An electrical junction box comprising a one-piece molded unit having an electrical box portion formed by first side walls and a rear wall, and opening forwardly, said walls forming a chamber for receiving electrical components,
   a housing having a front wall extending outwardly from the side walls of the electrical box portion around its entire periphery, and having second side walls extending rearwardly from the front wall, said second side walls being spaced from the side walls of the electrical box portion and extending rearwardly at least $\frac{1}{2}''$ past the bottom of the electrical box portion, said first and second side walls and rear wall of the electrical box portion forming a second, rearwardly opening chamber.

2. The junction box of claim 1 wherein the side walls of the electrical box portion extend forwardly at least about 3/16" from the front wall.

3. The junction box of claim 1 wherein the side walls of the electrical box portion extend forwardly from about 3/16"-$\frac{3}{4}$" from the front wall.

4. The junction box of claim 1 wherein the junction box is a one-piece molded fiberglass unit.

5. The junction box of claim 1 wherein the second chamber is filled with a fire-resistant insulating material.

6. The junction box of claim 1 wherein the second rearwardly opening chamber is filled with a fluid insulative material which hardens to form a rigid insulating material entirely filling said rearward chamber.

7. The junction box of claim 1 wherein the second rearwardly chamber is filled with calcinated gypsum.

8. A method of manufacturing an electrical junction box comprises
   molding a one-piece housing comprising an interior container portion having side walls and a rear wall and opening forwardly, and having a second container portion formed by walls extending outwardly from the first container portion and opening rearwardly, said second container portion forming a chamber substantially surrounding the side walls and rear walls of the first container,
   filling the rearwardly opening chamber with a hardenable fluid insulating material and allowing the insulating material to harden, and
   drilling at least one conduit through the side walls of both the first and second container, thereby providing a conduit from the exterior of the junction box to the interior of the first container.

9. A method of manufacturing an electrical junction box comprises
   fabricating a one-piece molded fiberglass container comprising an electrical box portion formed by side walls and a rear wall and opening forwardly, said walls forming a chamber for receiving electrical components, a housing having a front wall extending outwardly from the side walls of the electrical box portion around its entire periphery, and having second side walls extending rearwardly from the front wall, said second side walls being spaced from the side walls of the electrical box portion and extending rearwardly at least $\frac{1}{2}''$ past the bottom of the electrical box portion, said first and second side walls and rear wall of the electrical box portion forming a second, rearwardly opening chamber,
   filling the rearwardly opening chamber with a hardenable fluid insulating material and allowing the insulating material to harden, and
   drilling at least one conduit through the side walls of the housing portion and the electrical box portion.

* * * * *